(12) United States Patent
Lehocky

(10) Patent No.: US 11,117,606 B2
(45) Date of Patent: Sep. 14, 2021

(54) PERSONAL SHOPPING CART

(71) Applicant: Brett Lehocky, Bakersfield, CA (US)

(72) Inventor: Brett Lehocky, Bakersfield, CA (US)

( * ) Notice: Subject to any disclaimer, the term of this patent is extended or adjusted under 35 U.S.C. 154(b) by 364 days.

(21) Appl. No.: 16/375,691

(22) Filed: Apr. 4, 2019

(65) Prior Publication Data

US 2019/0308650 A1 Oct. 10, 2019

Related U.S. Application Data

(60) Provisional application No. 62/652,480, filed on Apr. 4, 2018.

(51) Int. Cl.
*B62B 1/00* (2006.01)
*B62B 3/02* (2006.01)
*B62B 5/00* (2006.01)

(52) U.S. Cl.
CPC ............ *B62B 3/027* (2013.01); *B62B 5/0003* (2013.01); *B62B 2203/073* (2013.01); *B62B 2203/10* (2013.01); *B62B 2206/06* (2013.01)

(58) Field of Classification Search
CPC .. B62B 3/027; B62B 3/02; B62B 3/00; B62B 3/0606; B62B 3/0618; B62B 3/0612; B62B 3/0643; B62B 5/0003; B62B 5/00; B62B 5/0083; B62B 5/0089; B62B 2203/073; B62B 2203/10; B62B 2203/071; B62B 2203/00; B62B 2203/07; B62B 2203/70; B62B 2203/72; B62B 2206/06; B62B 2206/003; B62B 2206/00
See application file for complete search history.

(56) References Cited

U.S. PATENT DOCUMENTS

| | | | | |
|---|---|---|---|---|
| 3,118,553 A | * | 1/1964 | Rosenzweig | B62B 5/0003 414/469 |
| 4,604,022 A | * | 8/1986 | Bourgraf | B60R 5/04 254/120 |
| 4,941,797 A | * | 7/1990 | Smillie, III | B60R 5/04 187/269 |
| 5,575,605 A | | 11/1996 | Fisher | |
| 6,024,527 A | * | 2/2000 | Soriano | B60R 5/04 254/10 R |
| 6,431,319 B1 | * | 8/2002 | Myers | B62B 3/02 187/243 |

(Continued)

*Primary Examiner* — James M Dolak
(74) *Attorney, Agent, or Firm* — William G. Heedy; The Van Winkle Law Firm

(57) ABSTRACT

A personal shopping cart includes a supporting frame hingedly connected to a base frame; a plurality of wheels; a detachable support assembly including opposing first and second horizontal support members; opposing first and second side members each being sized and configured for selective attachment to and detachment from a corresponding one of the opposing first and second horizontal support members; a support surface secured between the opposing first and second side members; and wherein the side members and the support surface collectively form a receptacle that is sized for receipt of a shopping basket; wherein the receptacle is detached from the opposing first and second horizontal support members; and wherein the base frame and the opposing first and second horizontal support members are structured and disposed to be folded against the supporting frame when the personal shopping cart is stored.

7 Claims, 4 Drawing Sheets

(56) References Cited

U.S. PATENT DOCUMENTS

| | | | |
|---|---|---|---|
| 7,080,844 B2 | 7/2006 | Espejo | |
| 7,188,847 B1 * | 3/2007 | Friedman | B62B 3/006 |
| | | | 280/47.19 |
| 7,722,058 B2 * | 5/2010 | Giampavolo | B62B 3/144 |
| | | | 280/33.991 |
| 7,976,033 B2 * | 7/2011 | Alves | B62B 3/14 |
| | | | 280/47.35 |
| 8,540,273 B2 | 9/2013 | Dobrachinski | |
| 8,662,605 B2 * | 3/2014 | McRorie | A61B 50/13 |
| | | | 312/276 |
| 8,979,115 B1 | 3/2015 | Baron | |
| 9,382,035 B2 * | 7/2016 | Fritz | B62B 1/12 |
| 11,046,343 B2 * | 6/2021 | Stroh | B62B 5/0003 |
| 2005/0012286 A1 * | 1/2005 | Woodrow | B62B 3/14 |
| | | | 280/47.35 |
| 2007/0096437 A1 * | 5/2007 | Watson | B62B 3/106 |
| | | | 280/651 |
| 2011/0156375 A1 * | 6/2011 | Gal | B62B 5/0003 |
| | | | 280/651 |
| 2011/0304125 A1 * | 12/2011 | Ravnborg | B62B 3/027 |
| | | | 280/651 |
| 2016/0347341 A1 * | 12/2016 | Tauber | B62B 3/027 |

* cited by examiner

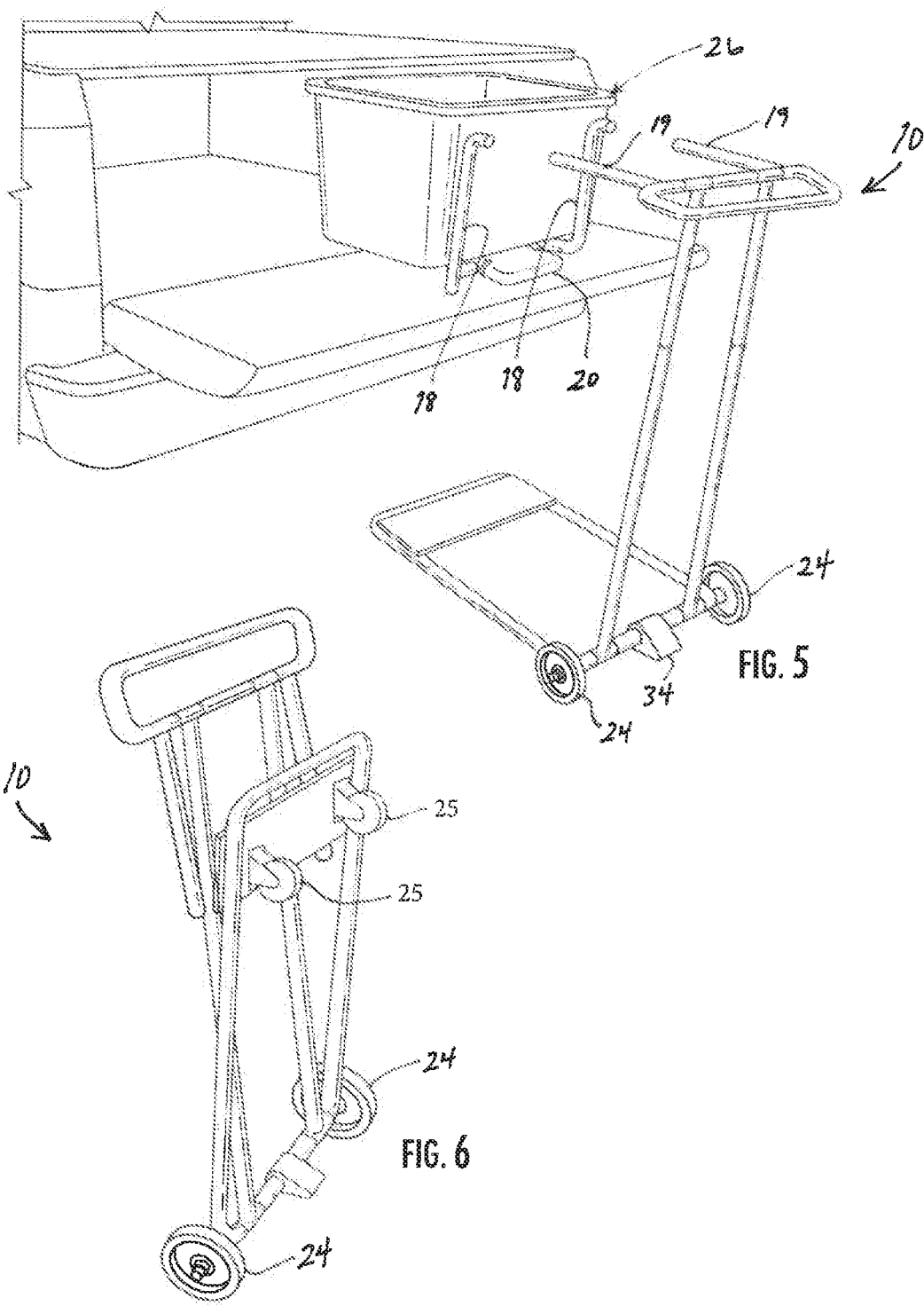

PERSONAL SHOPPING CART

RELATED APPLICATION

This application claims priority to and incorporates entirely by reference U.S. Provisional Patent Application Ser. No. 62/652,480 filed on Apr. 4, 2018.

FIELD OF THE INVENTION

This invention relates to wheeled land vehicles and, more particularly, personal shopping carts with adjustable heights and capabilities of easy loading and unloading into and out of various types of vehicles.

BACKGROUND OF THE INVENTION

Shopping carts are indispensable transportation tools for shoppers in grocery stores or big shopping malls. Presently available shopping carts have a number of disadvantages, including, but not limited to: (1) shopping carts provided by the grocery stores or shopping malls are used by a large number of shoppers, and may become resources for germ transmission; (2) shopping carts with a fixed height are appropriately sized relative to certain shoppers within a particular range of heights, but may present ergonomic difficulties to those having a height outside of that particular range; and (3) shopping carts only transport shopping items from the grocery stores or shopping malls to the shoppers' personal vehicles, and they have to manually load the shopping items, either individually or by groupings in multiple bags, into their vehicles and then unload when they are back home.

To minimize the germ transmission, personal shopping carts were invented for shoppers. Some inventors disclosed personal shopping carts with adjustable heights that are either fit for shoppers of different heights or collapsible for storage inside vehicles. Such a typical personal shopping cart includes a shopping basket that slides or moves onto a flat surface of the cargo of an SUV or a truck. Then the retractable supporting legs or adjusting legs are folded under or besides the shopping basket for storage. Thus, there is no need to load or unload the shopping items into and out of the vehicle, achieving a shopping experience without requiring any lifting during the entire shopping trip, for example, from the grocery store to the personal vehicle and then to the pantry at home.

Accordingly, there exists a need for loading and unloading a full shopping basket into and out of vehicles and over the "lip" of the sedan's trunk.

SUMMARY OF THE INVENTION

In accordance with one form of the present invention, a personal shopping cart for transporting items to a destination, the personal shopping cart includes a supporting frame hingedly connected to a base frame; a plurality of wheels; a detachable support assembly including opposing first and second horizontal support members, each of the opposing first and second horizontal support members being hingedly connected to the supporting frame; opposing first and second side members each being sized and configured for selective attachment to and detachment from a corresponding one of the opposing first and second horizontal support members; a support surface secured between the opposing first and second side members; and wherein the opposing first and second side members and the support surface collectively form a receptacle that is sized and configured for receipt of a shopping basket; wherein the detachable support assembly is positionable above the destination and the receptacle is detached from the opposing first and second horizontal support members; and wherein the base frame and the opposing first and second horizontal support members are structured and disposed to be folded against the supporting frame when the personal shopping cart is stored.

In accordance with another form of the invention, there is provided a personal shopping cart for transporting items to a destination, the personal shopping cart including a supporting frame hingedly connected to a base frame, the supporting frame including opposing first and second supporting legs that are selectively height adjustable; a pneumatic foot pedal for selectively adjusting the height of the opposing first and second supporting legs; a plurality of wheels; a detachable support assembly including opposing first and second horizontal support members, each of the opposing first and second horizontal support members being hingedly connected to the supporting frame; opposing first and second side members each being sized and configured for selective attachment to and detachment from a corresponding one of the opposing first and second horizontal support members; a support surface secured between the opposing first and second side members, the support surface being selectively operable between a stowed position and an extended position; wherein the opposing first and second side members and the support surface collectively form a receptacle that is sized and configured for receipt of a shopping basket; and wherein selective rotation of the shopping basket is permitted when the support surface is in the extended position; wherein the detachable support assembly is positionable above the destination and the receptacle is detached from the opposing first and second horizontal support members; and wherein the base frame and the opposing first and second horizontal support members are structured and disposed to be folded against the supporting frame when the personal shopping cart is stored.

In sum, the shopping cart has the capabilities of raising a full shopping basket that then moves over a lip of a truck bed or a sedan's trunk and lowering the full shopping basket that finally sits on the bottom of the sedan's trunk. The same process in a reversed order works for unloading at home. Thus, the personal shopping cart prevents any lifting during the entire shopping trip, which is particularly useful for minors and elders. Further, the shopping car is height adjustable, appropriate for shoppers of different heights. Finally, the shopping car is not shared among shoppers, minimizing germ transmission during shopping trips.

BRIEF DESCRIPTION OF THE DRAWINGS

For a fuller understanding of the nature of the present invention, reference should be made to the following detailed description, taken in conjunction with the accompanying drawings in which:

FIG. 5 is a perspective view of the shopping cart illustrating the detachable support assembly detached from the supporting frame; and FIG. 6 is a perspective view of the shopping cart illustrating the supporting frame in a stowed configuration.

DETAILED DESCRIPTION OF THE PREFERRED EMBODIMENTS

Referring to the several views of the drawings, the personal shopping cart of the present invention is shown and is generally indicated as 10.

Figure 1:
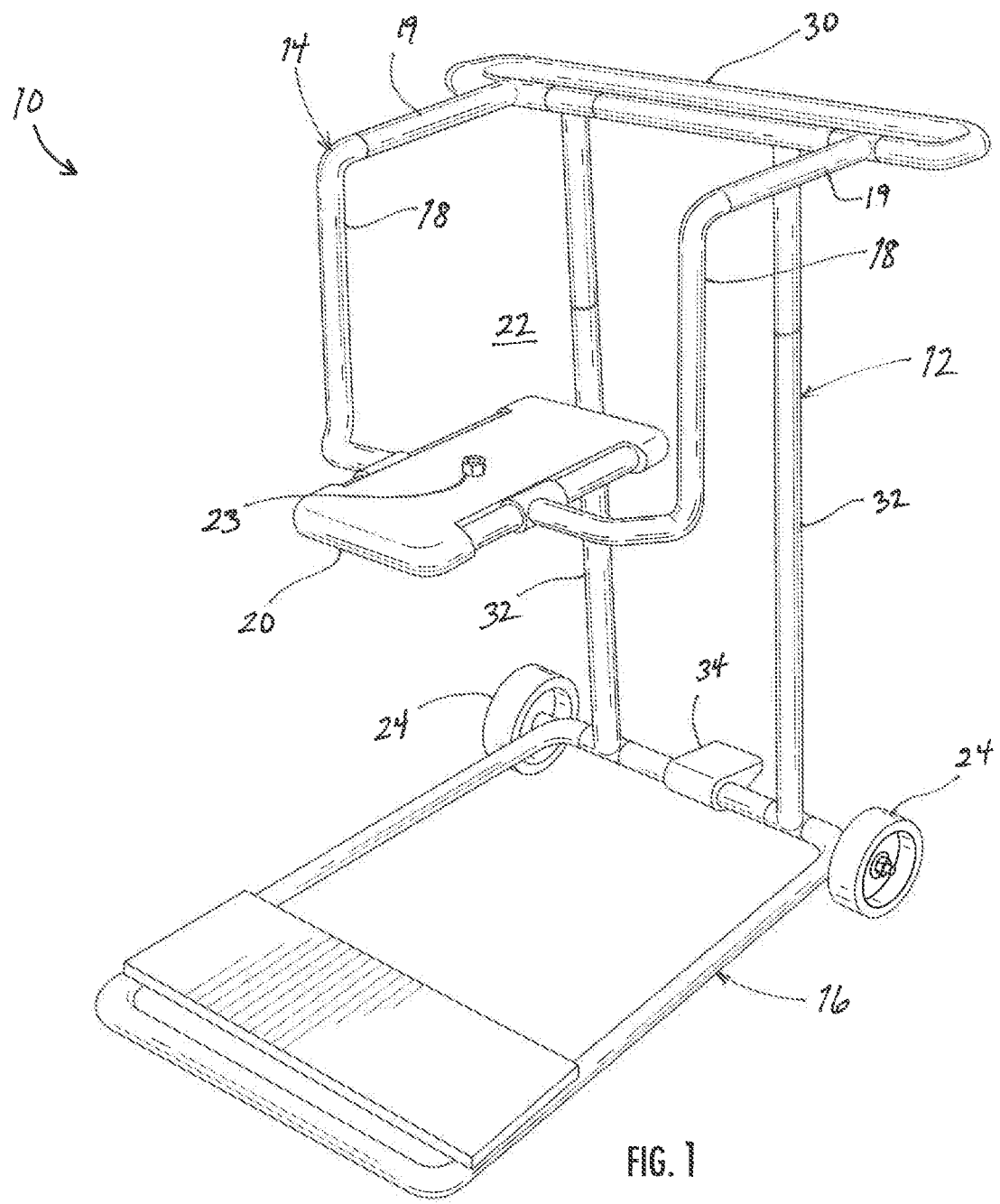
FIG. 1 is a perspective view illustrating the shopping cart of the present invention.

Referring initially to FIG. 1, the personal shopping cart 10 has a similar appearance relative to a traditional shopping cart. The cart 10 includes a supporting frame 12, a detachable support assembly 14 and a base frame 16. The detachable support assembly 14 is selectively detachable from the supporting frame 12 and includes opposing side members 18 each being integrally secured to a support surface 20, thereby collectively forming a receptacle 22. A pivot member 23 is located on the top surface of the support surface 20. A plurality of wheels 24 are secured to the base frame 16. In one embodiment, one or more front wheels of the plurality of wheels 24 are castor wheels 25. A shopping basket 26 is surrounds a cavity 28 and is sized and configured for engaged receipt within the receptacle 22 of the detachable support assembly 14. One or more handles 30 are provided for a user to direct the shopping cart 10 during transport.

A portion of the supporting frame 12 includes one or more height adjustable supporting legs 32. A pneumatic foot pedal 34 is provided for selectively adjusting the supporting legs 32 and, therefore, concurrently adjusting the height of the detachable support assembly 14.

Figure 2:
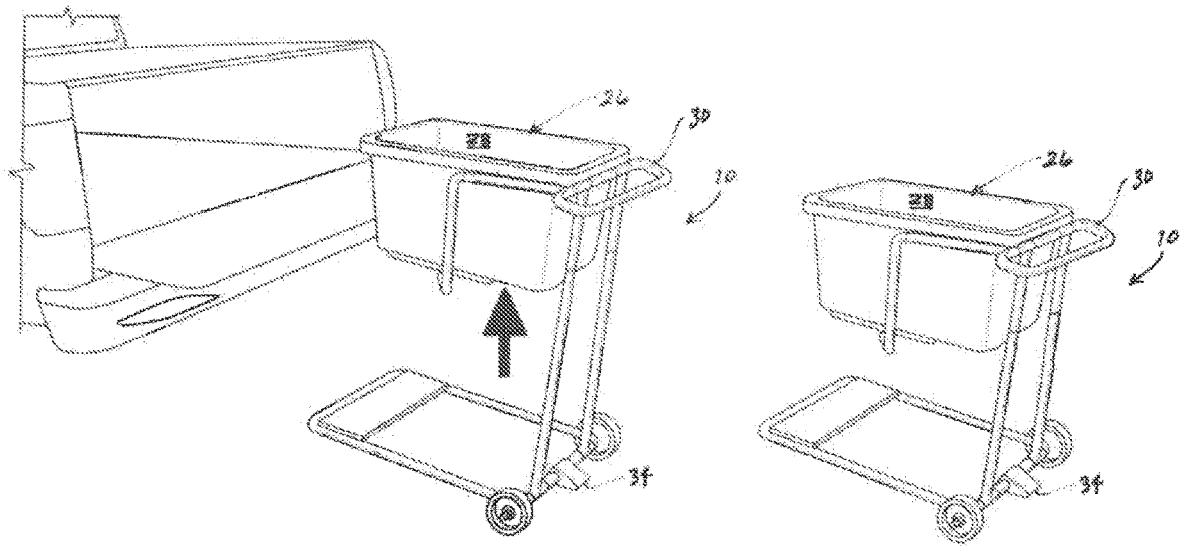
FIG. 2 is a perspective view of the shopping cart illustrating a height adjustment of the detachable support assembly relative to the base frame.
Figure 3:
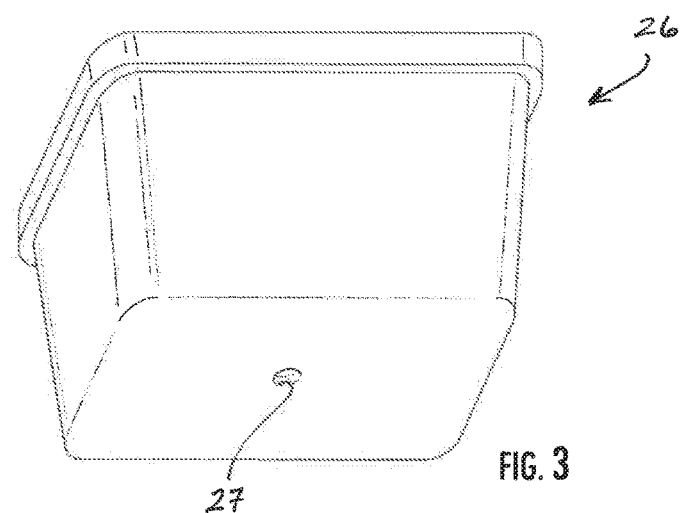
FIG. 3 is a perspective view of the shopping basket illustrating the bottom surface thereof.
Figure 4A:
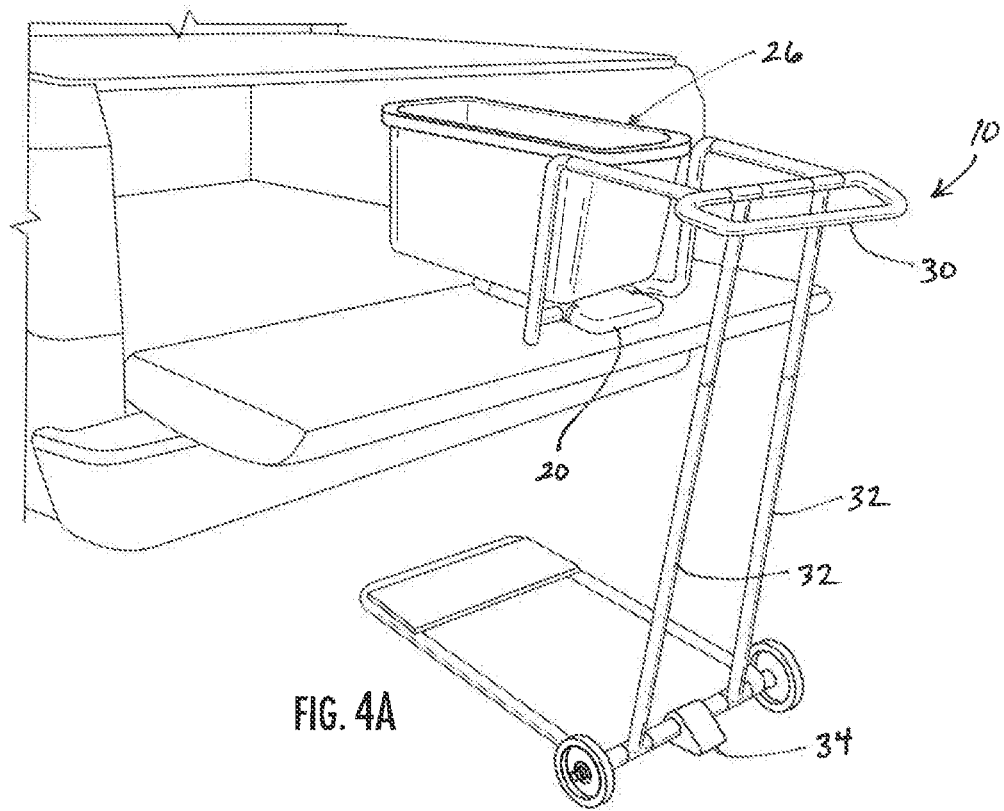
FIG. 4A is a perspective view illustrating the shopping cart and including a shopping basket on the support surface, which is in the extended position.
Figure 4B:
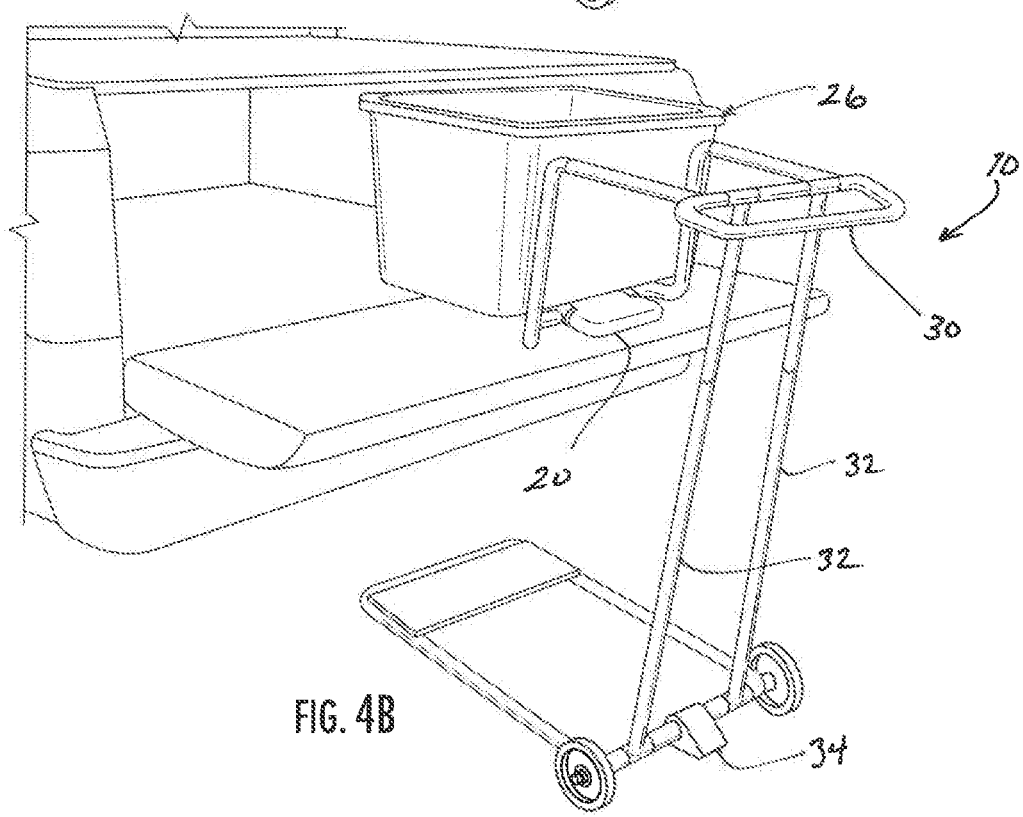
FIG. 4B is a perspective view of the shopping cart illustrating the shopping basket after having been rotated 90-degrees.

Referring to FIG. 2, when the personal shopping cart 10 approaches the trunk of a vehicle or other loading area, the shopping basket 26 is raised by adjusting the height of the supporting legs 32 using the pneumatic foot pedal 34 until the bottom of the detachable support assembly 14 is higher than the lip of the vehicle's trunk. The support surface 20 is structured and disposed to be operable between a stowed position, as illustrated in FIGS. 1 and 2, and an extended position, as illustrated in FIGS. 4A and 4B. In the stowed position, the opposing side members 18 prevent rotational movement of the basket 26. In the extended position, the side members 18 are cleared by the basket 26 for selective rotation thereof by the user. Referring now to FIGS. 3-4B, if necessary, the shopping basket 26 may be rotated about the pivot member 23 such that the shopping basket 26 is more congruently aligned with the trunk or other space which the basket 26 will be transported onto. In one embodiment, a notch 27 is formed on the basket 26 and is sized and configured for congruent receipt of the pivot member 23. In one embodiment, the basket may be rotated within a range of 90°. Rotation of the shopping basket 26 is accomplished by manually applying rotation force thereto by a user until the length of the shopping basket 26 is in alignment with the width of the vehicle trunk (or other surface area).

Importantly, the shopping cart 10 is shaped such that the base frame 16 may be moved forward until its front wheels 24 and a significant portion of the base frame 16 are underneath the back of the automobile. Meanwhile, the entirety of the shopping basket 26 has moved over the lip of the automobile's trunk. After the basket 26 has been rotated (if necessary), the shopping basket 26 is then lowered by adjusting the height of the supporting legs 32 until the receptacle 22 and accompanying shopping basket 26 sit in the automobile's trunk. Referring specifically to FIG. 5, the opposing side members 18 and support surface 20 portions of the detachable support assembly 14 may be disconnected for storage of thereof along with the basket 26 in the automobile's trunk, leaving only horizontal support members 19 connected to the supporting frame 12.

Referring to FIG. 6, the supporting frame 12 may be folded into a stowed configuration for being stored in the vehicle. After detaching the supporting frame 12 from a portion of the detachable support assembly 14, leaving the horizontal support members 19 connected to the supporting frame 12, the base frame 16 and horizontal support members 19 are each folded against the supporting frame 12 for storage thereof. When the shopper arrives at home, he or she reconnects the detachable support member 14, lifts the shopping basket 26 up by adjusting the height of the supporting legs 32, and then moves the shopping basket 26 outwards from the vehicle by moving over the lip of the trunk.

While the present invention has been shown and described in accordance with several preferred and practical embodiments, it is recognized that departures from the instant disclosure are contemplated within the spirit and scope of the present invention.

What is claimed is:

1. A personal shopping cart for transporting items to a destination, the personal shopping cart comprising:
    a supporting frame hingedly connected to a base frame;
    a plurality of wheels;
    a detachable support assembly comprising:
        opposing first and second horizontal support members, each of the opposing first and second horizontal support members being connected to the supporting frame;
        opposing first and second side members each being selectively attachable to and detachable from a corresponding one of the opposing first and second horizontal support members;
        a support surface secured between the opposing first and second side members;
        wherein the opposing first and second side members and the support surface collectively form a receptacle for receiving a shopping basket; and
        the support surface being selectively operable between a stowed position and an extended position, wherein selective rotation of the shopping basket is permitted when the support surface is in the extended position;
    the shopping basket being selectively rotatable about a pivot member protruding from the support surface;
    wherein the detachable support assembly is positionable above the destination and the receptacle is detached from the opposing first and second horizontal support members; and
    wherein the base frame and the opposing first and second horizontal support members are each folded against the supporting frame when the personal shopping cart is stored.

2. The personal shopping cart as recited in claim 1 the supporting frame further comprises a handle.

3. The personal shopping cart as recited in claim 1 wherein the supporting frame comprises opposing first and second supporting legs that are selectively height adjustable.

4. The personal shopping cart as recited in claim 1 wherein at least one of the plurality of wheels is a castor wheel.

5. A personal shopping cart for transporting items to a destination, the personal shopping cart comprising:
- a supporting frame hingedly connected to a base frame, the supporting frame including opposing first and second supporting legs;
- a plurality of wheels;
- a detachable support assembly comprising:
  - opposing first and second horizontal support members, each of the opposing first and second horizontal support members being connected to the supporting frame;
  - opposing first and second side members each being selectively attachable to and detachable from a corresponding one of the opposing first and second horizontal support members;
  - a support surface secured between the opposing first and second side members, the support surface being selectively operable between a stowed position and an extended position;
  - wherein the opposing first and second side members and the support surface collectively form a receptacle for receiving a shopping basket; and
  - wherein selective rotation of the shopping basket is permitted when the support surface is in the extended position;
- wherein the detachable support assembly is positionable above the destination and the receptacle is detached from the opposing first and second horizontal support members;
- wherein the base frame and the opposing first and second horizontal support members are each folded against the supporting frame when the personal shopping cart is stored; and
- the shopping basket being selectively rotatable about a pivot member protruding from the support surface.

6. The personal shopping cart as recited in claim 5 wherein the supporting frame further comprises a handle.

7. The personal shopping cart as recited in claim 5 wherein at least one of the plurality of wheels is a castor wheel.

* * * * *